United States Patent

Udagawa

[11] Patent Number: 5,879,012
[45] Date of Patent: Mar. 9, 1999

[54] METAL GASKET WITH REDUCED THICKNESS BEAD

[75] Inventor: Tsunekazu Udagawa, Ichikawa, Japan

[73] Assignee: Ishikawa Gasket Co., Ltd., Tokyo, Japan

[21] Appl. No.: 859,316

[22] Filed: May 20, 1997

[51] Int. Cl.⁶ .................................................. F02F 11/00
[52] U.S. Cl. ........................................... 277/595; 277/593
[58] Field of Search .................................. 177/593, 594, 177/595, 591, 590

[56] References Cited

U.S. PATENT DOCUMENTS

| | | | |
|---|---|---|---|
| 5,255,926 | 10/1993 | Udagawa | 277/595 |
| 5,582,415 | 12/1996 | Yoshida et al. | 277/595 X |
| 5,626,350 | 5/1997 | Kubouchi et al. | 277/595 |
| 5,628,113 | 5/1997 | Tanaka et al. | 277/595 X |
| 5,628,518 | 5/1997 | Ushio et al. | 277/593 |

*Primary Examiner*—Anthony Knight
*Assistant Examiner*—Greg Binda
*Attorney, Agent, or Firm*—Kanesaka & Takeuchi

[57] ABSTRACT

A metal gasket of the invention is used for an internal combustion engine and is basically formed of one metal plate. The plate includes a hole, an elongated or annular recess formed on the metal plate to surround the hole and a bead formed in the elongated recess. The elongated recess extends from an outer surface of the metal plate, and the thickness of the bead is less than the thickness of the metal plate. A top portion of the bead projects outwardly beyond the outer surface of the metal plate. Thus, when the metal plate is tightened, the top portion of the bead is compressed to a level corresponding to the outer surface of the plate to protect the bead. Therefore, creep relaxation of the bead is reduced or prevented.

7 Claims, 1 Drawing Sheet

METAL GASKET WITH REDUCED THICKNESS BEAD

BACKGROUND OF THE INVENTION AND RELATED ART STATEMENT

The present invention relates to a metal gasket having a bead with a reduced thickness to regulate a surface pressure of the bead and to prevent creep relaxation of the bead.

In a metal gasket or a metal laminate gasket, a bead is generally formed around a hole to be sealed. The bead may be a projection projecting outwardly from a flat portion of a metal plate, or a step or an inclined wall on a metal plate. When the metal gasket is tightened between a cylinder head and a cylinder block, the bead on the metal plate is compressed to provide a surface pressure and to seal around the hole.

When the bead receives high temperature and pressure, the bead may creep. As a result, the bead can not provide sufficient sealing pressure thereat. In order to reduce creep relaxation of the bead, a surface pressure regulation plate may be laminated over the metal plate with the bead so that the bead can not be compressed more than the predetermined pressure. In this case, the thickness of the gasket is increased.

In view of providing a high quality engine, it is preferable to reduce the thickness of the gasket. In this respect, elimination of the surface pressure regulation plate is desired.

In the engine, on the other hand, a high pressure is formed in the cylinder bore due to combustion of fuel, while a moderate pressure is formed in other holes, such as water holes and oil holes. In order to securely seal around the high pressure portion, it is required to provide high surface pressures around the cylinder bores. For this purpose, bolts are arranged around the cylinder bores to securely seal around the cylinder bores. However, since the areas around the other holes need not have high surface pressures, the other holes are simply arranged near the cylinder bores and are sealed by the bolts situated around the cylinder bores.

Since the surface pressures required around the holes except the cylinder bore are different depending on the location and kind of the holes, it is preferable to form beads around the various holes, which can provide different surface pressures. However, in case the thickness and property of one metal plate is the same, it is difficult to provide beads with different surface pressures in one metal plate.

Of course, if the size of the bead, i.e. height and width of the bead, is changed, the surface pressure of the bead can be changed. However, the adjustment of the surface pressure by the size of the bead is limited.

In Japanese Patent Publication (KOKAI) No. 5-44847, a bead is formed on a metal plate around a cylinder bore, and except the area around the cylinder bore where the bead is formed, the thickness of the metal plate is reduced by etching. Since the thickness of the plate around the cylinder bore is increased, when the metal plate is compressed, the surface pressure around the cylinder bore is increased. However, since the bead is directly compressed without the surface pressure regulation plate, the bead may creep.

The present invention has been made in view of the above situations, and an object of the invention is to provide a metal gasket with a bead, wherein a surface pressure of the bead can be easily changed and adjusted.

Another object of the invention is to provide a metal gasket as stated above, wherein creep relaxation of the bead can be reduced or prevented without using a surface pressure regulation plate.

A further object of the invention is to provide a metal gasket as stated above, wherein when a plurality of beads is formed in one metal plate, surface pressures of the beads can be adjusted or regulated easily.

Further objects and advantages of the invention will be apparent from the following description of the invention.

SUMMARY OF THE INVENTION

A metal gasket for an internal combustion engine of the invention is basically formed of one metal plate with a predetermined first thickness. If necessary, however, the metal plate may be combined with one or more metal plates to constitute a metal laminate gasket.

The metal plate includes a first hole, and a first elongated or annular recess formed on the metal plate to surround the first hole. The first elongated recess extends from a first outer surface of the metal plate to provide a second thickness to the metal plate at the first elongated recess, which is thinner than the first thickness.

A first bead is formed in the first elongated recess to provide a top portion projecting beyond the first outer surface of the metal plate. Therefore, when the metal plate is tightened, the top portion of the first bead is compressed to a level corresponding to the first outer surface of the metal plate. Since the first bead is not completely flattened, creep relaxation of the first bead is prevented or reduced.

In the invention, since the first bead is formed in the first elongated recess with the predetermined thickness, if the thickness of the recess in the plate is changed, the surface pressure can be easily changed. In the conventional gasket, the surface pressure of the bead in one metal plate can be changed by changing the width and/or height of the bead. In the invention, by changing the thickness of a part of the metal plate, the surface pressure of the first bead can be changed or regulated easily.

Also, in the invention, the first bead projects from the first outer surface of the metal plate at the first elongated recess, and the top portion of the first bead projects beyond the first outer surface of the metal plate. Therefore, when the first bead is tightened, the first bead is compressed to the level corresponding to the first outer surface operating as a surface pressure regulation member. Since the first bead is not completely flattened, creep relaxation of the first bead is prevented or reduced.

The gasket may further include a second hole in the metal plate, and a second bead on the metal plate with the first thickness to surround the second hole. The second bead has spring constant greater than that of the first bead. Namely, the second hole may be a cylinder bore, and the first hole may be a fluid hole. As a result, it is possible to provide a high surface pressure around the cylinder bore, and a moderate surface pressure around the fluid hole.

The metal plate may include a second elongated recess extending from a second outer surface and located behind the first elongated recess to correspond thereto. The first and/or second elongated recess and the first bead may be formed at once by a coining processing. Accordingly, the recess and the bead can be formed easily.

DETAILED DESCRIPTION OF PREFERRED EMBODIMENTS

Figure 1:
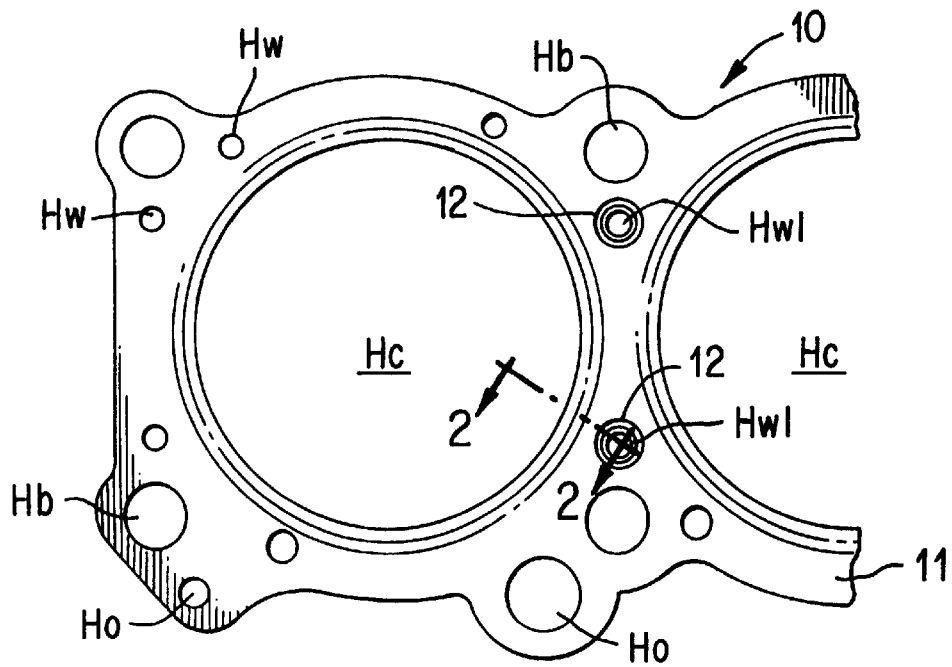
FIG. 1 is a partial plan view of a first embodiment of a metal gasket of the invention.
Figure 2:
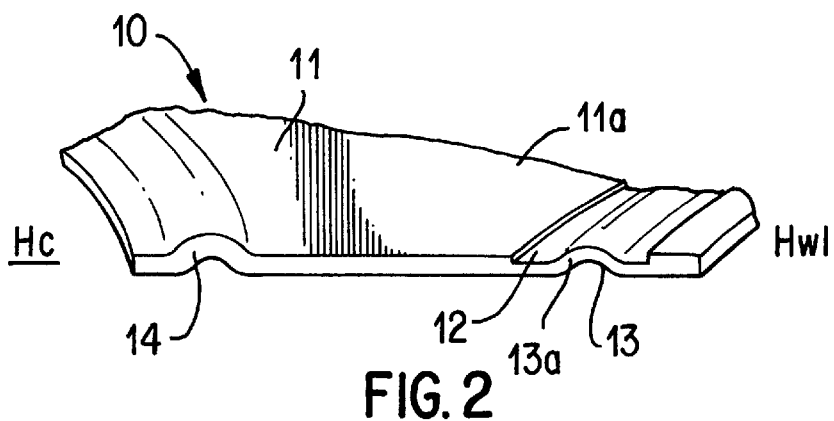
FIG. 2 is an enlarged sectional view taken along a line 2—2 in FIG. 1.

A first embodiment 10 of the invention is shown in FIGS. 1 and 2. The gasket 10 is a cylinder head gasket and includes a plurality of cylinder bores Hc, water holes Hw, Hw1, oil holes Ho, bolt holes Hb, and so on, as in the conventional gasket. In the embodiment as shown in FIGS. 1 and 2, the invention is directed to the structure around the water hole Hw1. Therefore, the structure of the water hole Hw1 and a sealing mechanism of the cylinder bore Hc in association therewith are shown. The other structures are not explained, but any sealing mechanism may be used.

The gasket 10 is formed of one metal plate 11, and extends throughout an entire area between a cylinder head and a cylinder block (both not shown) to be sealed. The plate 11 has annular recesses 12 around the water holes Hw1, and beads 13 in the annular recesses 12. Namely, one annular recess 12 is formed around one water hole Hw1 to extend backwardly from an outer surface 11a of the plate 11, and one bead 13 is formed in the middle of the annular recess. A top 13a of the bead 13 extends upwardly from the recess 12 beyond the outer surface 11a of the plate 11.

In the gasket 10, the annular recesses 12 and the beads 13 are formed at once by pressing the plate 11, i.e. a coining processing. Thus, the annular recesses 12 and the beads 13 can be formed easily. However, other processes may be applicable as long as the recesses and the beads are formed easily.

Around the cylinder bores Hc, the metal plate 11 includes beads 14 extending upwardly from the outer surface 11a thereof. The beads 14 are regular beads to seal around the cylinder bores Hc.

When the gasket 11 is installed between the cylinder head and the cylinder block, and is tightened, the beads 13, 14 are compressed. The bead 14 is substantially flattened along the outer surface 11a of the plate 11, but the bead 13 is compressed to the horizontal level of the outer surface 11a of the plate 11. Namely, the bead 13 is not completely flattened, and the top 13a of the bead is located inside the annular recess 12. Therefore, the outer surface 11a of the plate 11 operates as a surface pressure regulation member. Creep relaxation of the bead 13 is reduced or substantially prevented.

In the gasket 10, since the thickness of the bead 13 or the recess 12 is controlled, the surface pressure of the bead 13 is controlled as well. Also, since the thickness of the bead 13 is thinner than that of the bead 14, the surface pressure of the bead 13 can be formed less than that of the bead 14. Therefore, the bead 13 is especially useful for a portion where no high surface pressure is required.

When an engine is started, the cylinder head made of aluminum alloy expands by heat quickly, while the bolts which are made of iron and are used to connect the cylinder head and the cylinder block are heated gradually. As a result, a large tightening pressure is applied to the cylinder head gasket situated between the cylinder head and the cylinder block as well as the cylinder head. At this time, generally, since a bead on the gasket is compressed extremely strongly, and the strong compression is repeated for a while, creep relaxation may occur in the bead.

In the invention, the thin bead 13, which is liable to creep, is located in the recess 12 and is not completely flattened. Therefore, creep relaxation of the bead 13 is reduced or substantially prevented.

Incidentally, since the bead 14 is made thick, the bead 14 does not creep so easily as compared with the thin bead 13. Therefore, the area around the cylinder bore Hc can be sealed properly.

In the invention, the bead 14 is directly formed on the metal plate 11 without being formed in the recess, but the bead 14 around the cylinder bore Hc may be formed in a recess to have a protection as in the bead 13. In this case, the thickness of the bead 14 must be thicker than that of the bead 13 to provide high surface pressure around the cylinder bore Hc.

Figure 3:
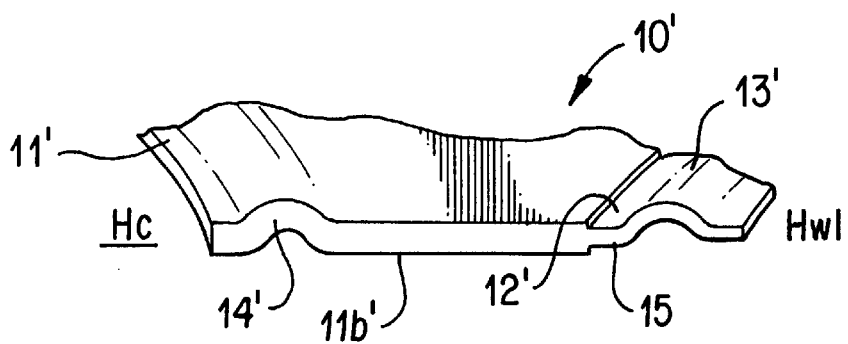
FIG. 3 is an enlarged sectional view, similar to FIG. 2, to show a second embodiment of the metal gasket of the invention.

FIG. 3 shows a second embodiment 10' of the metal gasket of the invention. The gasket 10' is formed of a metal plate 11' and includes a recess 12' and beads 13', 14', as in the gasket 10. However, in the gasket 10', the recess 12' faces the water hole Hw1, and a recess 15 extends from a lower surface 11b' of the plate 11'. In the gasket, since the bead 13' is formed at an area of the plate 11' sandwiched between the recesses 12', 15, the thickness of the bead 13' can be adjusted or regulated more easily. The rest of the structure and advantages of the gasket 10' are the same as in the gasket 10.

In the invention, the gasket can be formed of one metal plate, but the surface pressure of the bead formed on the metal plate can be regulated or adjusted easily. Further, creep relaxation of the bead can be properly reduced or prevented. The metal plate 11 or 11' may be combined with one or more metal plates to constitute a metal laminate gasket.

While the invention has been explained with reference to the specific embodiments of the invention, the explanation is illustrative and the invention is limited only by the appended claims.

What is claimed is:

1. A metal gasket for an internal combustion engine, comprising:
    a single metal plate for constituting the metal gasket having first and second metal outer surfaces and a first thickness between the first and second metal outer surfaces;
    a first hole formed in the metal plate;
    a first elongated recess formed in the metal plate to surround the first hole, said first elongated recess extending from the first metal outer surface to provide a second thickness to the metal plate at the first elongated recess, said second thickness being thinner than the first thickness; and
    a first bead formed on the metal plate and disposed in the first elongated recess, said first bead having a top portion projecting beyond the first metal outer surface of the metal plate so that when the metal plate is tightened, the top portion of the first bead is compressed to a level corresponding to the first metal outer surface to thereby reduce creep relaxation of the first bead.

2. A metal gasket according to claim 1, further comprising a second hole formed in the metal plate, and a second bead formed on the metal plate with the first thickness to surround the second hole, said second bead having spring constant stronger than that of the first bead.

3. A metal gasket according to claim 2, wherein said second hole is a cylinder bore, and the first hole is a liquid hole.

4. A metal gasket according to claim 1, further comprising a second elongated recess extending from the second metal outer surface and located behind the first elongated recess to correspond thereto.

5. A metal gasket according to claim 4, wherein said first and second elongated recesses directly extend from the first hole.

6. A metal gasket according to claim 1, wherein said first elongated recess and the first bead are formed at once by a coining processing.

7. A metal gasket according to claim 1, wherein said first elongated recess is an annular recess, and said single metal plate has an inner portion and an outer portion relative to the annular recess, said inner and outer portions having said first thickness.

* * * * *